United States Patent
Sator

(10) Patent No.: US 6,476,345 B1
(45) Date of Patent: Nov. 5, 2002

(54) DEVICE FOR WELDING TOGETHER THE ENDS OF TUBULAR PLASTIC CONTAINERS, NOTABLY TUBES

(75) Inventor: Alexander P Sator, Hamburg (DE)

(73) Assignee: Iwka Pacunion GmbH, Stutensee (DE)

(*) Notice: Subject to any disclaimer, the term of this patent is extended or adjusted under 35 U.S.C. 154(b) by 0 days.

(21) Appl. No.: 09/889,038
(22) PCT Filed: Jan. 12, 2000
(86) PCT No.: PCT/EP00/00168
§ 371 (c)(1), (2), (4) Date: Jul. 11, 2001
(87) PCT Pub. No.: WO00/43183
PCT Pub. Date: Jul. 27, 2000

(30) Foreign Application Priority Data

Jan. 19, 1999 (DE) ...................................... 299 00 811 U

(51) Int. Cl.[7] .............................................. B23K 26/20
(52) U.S. Cl. .................................................. 219/121.63
(58) Field of Search ........................ 219/121.63, 121.64, 219/121.65, 121.66, 121.76, 121.6, 121.85

(56) References Cited

U.S. PATENT DOCUMENTS 4,550,238 A  10/1985  van Herle
6,356,390 B1 * 3/2002  Hall, Jr. ...................... 359/627

FOREIGN PATENT DOCUMENTS

DE  34 01 959   7/1984
DE  44 25 861   1/1996
DE  297 12 264  11/1998

* cited by examiner

Primary Examiner—Samuel M. Heinrich

(57) ABSTRACT

A device for welding the ends of a tubular container made from plastic, in particular tubes has a holding device which holds the container in a stationary fashion with its open end facing in an upward direction and including means for warming a ring shaped peripheral region of the container proximate the opening to facilitate subsequent welding along an elongated seam travelling transverse to the longitudinal extension of the container. A mounting holds a plurality of diode lasers in an approximately circular manner such that their radiation is incident on the inner or outer wall of the container, either directly or via a deflection optics.

13 Claims, 1 Drawing Sheet

DEVICE FOR WELDING TOGETHER THE ENDS OF TUBULAR PLASTIC CONTAINERS, NOTABLY TUBES

BACKGROUND OF THE INVENTION

The invention concerns a device for welding the ends of tubular containers made from plastic, in particular tubes.

A large number of pourable or pasty media are packed in tubes, e.g. cosmetics, tooth paste, shoe polish, creams and the like. The tubes can be made from a suitable malleable flat metallic material. However, plastic material has been utilized for some time, primarily for economical reasons.

The tubular container blank is initially filled with the material to be contained prior to sealing the end. The removable side is sealed with a suitable cap, such as a screw cap or the like. The fill end is sealed following filling. When malleable flat material is used, a fold line has been conventionally effected on the fill end. Optionally, a linear pressing is carried out in the end region to thereby guarantee adequate sealing. This type of method cannot be utilized for plastic materials. Rather, the adjoined end portions must be welded or sealed together. DE 37 44 402 C2 discloses a method for sealing tubular containers made from plastic, the end sections of which are initially softened or melted through the introduction of heat or the like before producing a sealing seam with the assistance of a pressing device.

The softening is thereby effected by disposing a ring about the filling end having a plurality of nozzle openings to blow hot air onto the outer wall of the fill end of the tube. Since complete welding is normally required, substantial amounts of heat must be introduced externally, i.e. requiring up to approximately 18 kW of electrical power. This method is currently utilized in the packaging industry and is referred to as the "hot air" method.

In analogy to the hot air method, a softening or melting of the end which is to be welded has also conventionally been effected with the assistance of ultrasound or microwave radiation.

All these methods require the melting and the subsequent pressing together to be effected in sequential production steps, since the device for melting the material cannot assume the same spatial position as the pressing device. In addition, it is normally necessary to cool down the initially heated tube following the pressing procedure, since an undesirable malleable deformation could otherwise occur and since the product could also be damaged by the heat. As a result of this additional cooling step, this method is extremely wasteful.

DE 22 61 388 discloses a method for welding an end piece made from plastic onto a tubular plastic body, wherein the end piece, having a tubular section, is inserted into the tubular body. A laser is used to irradiate the outer side of the tubular body, whereby the tube and the end piece rotate. A pressing roller presses the warmed regions together and effects a type of welding.

It is the underlying purpose of the invention to create a method and a device for welding the ends of tubular containers, in particular tubes, which can be used for all conventional types of tube plastic and which requires little energy consumption with high production speed and modest technical effort.

SUMMARY OF THE INVENTION

This purpose is achieved with the features of the independent claim.

With the device in accordance with the invention, a preferentially segmented holder is provided for a plurality of laser diode units disposed approximately in a circle so that their beams are incident on the outer or inner wall of the container, either directly or via a deflection optics.

The wavelength of diode lasers is in the near infrared (approximate 650 nm to 1400 nm) and it is irrelevant for the effectiveness of the device whether or not the inner or the outer wall of the container is irradiated, since nearly all plastics which could be used are partially absorbing and the radiation can thereby be evenly active throughout the entire wall thickness (less than 1 mm). In order to simplify the mechanical construction, the outer wall should be irradiated. The melting of the inner wall, required for the pressing together procedure, is thereby effected through irradiation of the outer wall. The method in accordance with the invention provides for a homogenous heating of the melting zone. In order to improve the effectiveness, it is also possible to dispose a reflector inside the container, on that side facing away from the laser diodes, to reflect the radiation back into the material.

Beams emanating from a laser diode or from a laser diode array are strongly divergent, generally in a range between approximately 6 to 10 degrees in the plane of longitudinal extension of the laser diode (slow axis) and approximately 35 to 40 degrees in the plane of transverse extension of the laser diode (fast axis) perpendicular to the longitudinal extension. This situation can be partially taken advantage of in the device in accordance with the invention. In order to effect a continuous joining of the laser projections about the periphery of the container, one can assume that the fast perpendicular axis of the laser radiation (approximately 10 degrees) determines the radial separation of the laser diode units, disposed in a circle, from the container. In order to effect a continuous radiation in the peripheral direction, one should subtract a value of approximately 0.2 degrees from the value of the parallel radiation angle of the fast axis.

The laser diode radiation should advantageously be focussed to achieve sufficient power density (according to current experience, the power density should be >20 $W/cm^2$). In order to achieve this power density, e.g. the slow axis of the laser diode unit is strongly focused. A focus of approximately 0.5 mm can be achieved without any particular difficulty. On the other hand, the laser radiation irradiated in the peripheral direction of the container is e.g. only weakly focussed for adjusting the radiation pattern. An optimal focusing can thereby be effected as follows. The slow axis is focused to about 0.5 mm. The fast axis is not focused and maintains a radiation angle of approximately 45 degrees. In this fashion, one laser unit irradiates the periphery of the tubular body through a peripheral area of 0.5 mm×45 degrees. With a tube diameter of 25 mm, 40 degrees corresponds to 9.8 mm. This results in a irradiation area of 4.9 $mm^2$. With a laser output power of 20 W, this leads to a power density of approximately 40 $W/cm^2$.

An aspherical lens can be utilized to adjust the focus of the laser beam to the curvature of the cylindrical surface. In order to avoid this situation, the number of laser diode units can also be increased until the focal depth is sufficient to compensate for the curvature. The fast radiation axis is thereby focused in such a fashion that a radiation angle of 10 degrees is achieved. The 10 degree angle leads to a reduced curvature value on the surface of the tubular container which, under certain circumstances, must no longer be compensated for optically.

The mechanical positioning of the laser diodes likewise depends on the focus. The relative positions of the laser diode units necessarily change with increasing container circumference. The power density on the container wall thereby decreases proportionally. In this case as well, the laser diode units can be disposed at mutual separations corresponding to only a fraction of the fast axis radiation angle to compensate for this reduction in power density. As already mentioned above, this reduces problems related to the curvature of the container surface.

In a simple configuration, the laser diode units can be disposed in correspondence with their normal radiation characteristics (approximately 45 degree perpendicular radiation angle). This leads to eight laser diode units disposed about the axis of the container. In order to increase the power density of the above mentioned configuration by up to 200%, the axial separation between the laser diode units must be reduced to an angle of approximately 22.5 degrees.

In order to adapt to the diameter of the tubular container or to change the energy density at the point of incidence, an embodiment of the invention provides that the laser diode units can be displaced in the direction of their longitudinal axis. A suitable displacement device is correspondingly provided and adapted in such a fashion as to effect displacement of the laser diode units.

A circular or ring-shaped structure can be utilized for bearing and displacing the laser diode units which consists essentially of individual segments, each supporting a laser diode. The number of segments thereby corresponds to the number of laser diode units. Each segment can be individually borne for displacement along the longitudinal axis. All segments can be disposed together on a ring-shaped support.

An additional embodiment of the invention provides that the height of the segment support is adjustable for all segments. This permits change of the position of incidence on the outer wall of the container.

Instead of the above mentioned laser diode units, fiber coupled diode lasers or fiber lasers can be analogously utilized. The output optics must be adjusted in dependence on the type of laser.

The invention is described more closely with regard to embodiments shown in the drawing.

DESCRIPTION OF THE PREFERRED EMBODIMENT

Figure 1:
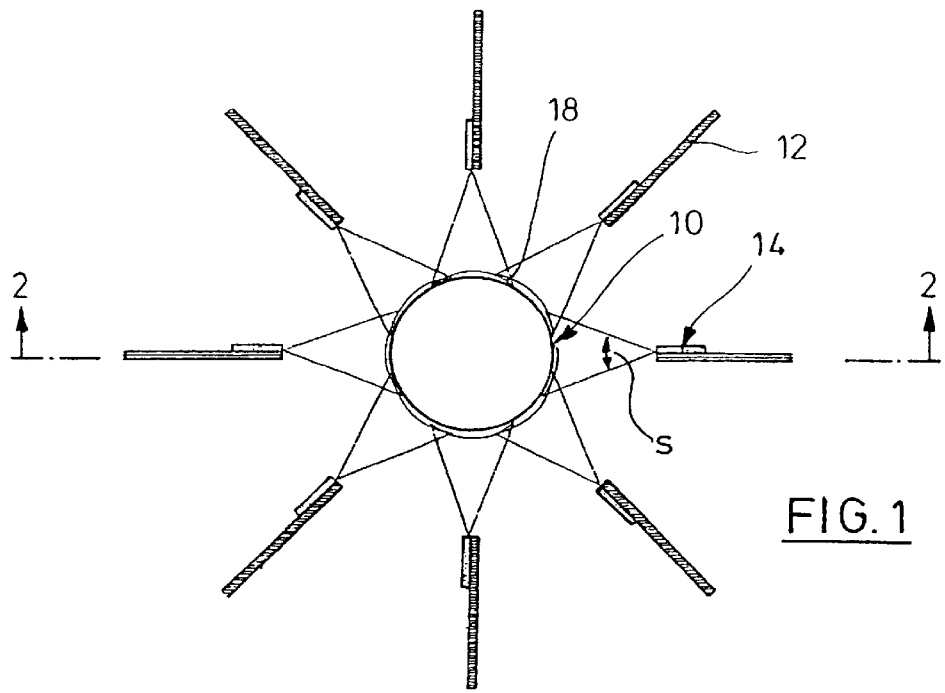
FIG. 1 shows a plan view of a schematic representation of a device in accordance with the invention.
Figures 2, 3:
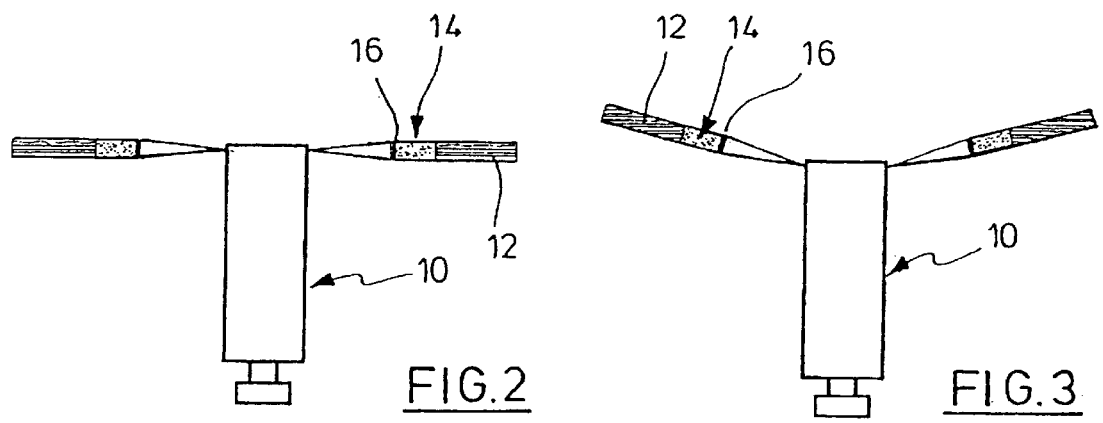
FIG. 2 shows a cut through the drawing of FIG. 1, along the line 2—2.
FIG. 3 shows an alternative embodiment to that of FIG. 2.

The tubular container 10 shown in FIGS. 1 and 2 is made from a relatively thin walled plastic material. The container is closed at the bottom and open at the top. The open end is subsequently pressed together between two linearly moving jaws to effect a transverse elongated welded sealing seam. Towards this end, the suitable plastic material from which the container 10 is made must first be softened. This softening is effected with the assistance of laser beams in the device shown in FIGS. 1 and 2.

FIG. 1 shows eight elongated holding segments 12 which, as can be seen in FIG. 2, lie in plane which is somewhat below the upper end of the tubular container 10 and which is perpendicular to the axis thereof. The support segments 12 bear diode lasers 14 at an end facing the container 10. As can be seen in FIG. 2, a micro-lens 16 is positioned in front of each diode laser 4. As seen in the peripheral direction of the container 10, a laser 14 has a radiation angle s of approximately 45 degrees. The lasers 14 and the support segments 12 are disposed in such a fashion that each irradiated peripheral section slightly overlaps its neighboring sections, as shown by reference symbol 18. The diode lasers 14 conventionally have a narrow elongated output region. They are thereby disposed in such a fashion that the longitudinal extension of the output region is parallel to the container axis. The radiation in this direction is distributed through a smaller angle, e.g. 10 degrees. The axis having the smaller radiation angle is designated as the slow axis and the axis perpendicular thereto, i.e. transverse to the longitudinal axis, is designated as the fast axis. In other words, the slow axis of laser 14 is parallel to the axis of the container and the fast axis is transverse thereto.

In this embodiment, e.g. only the slow axis is focused (as shown in FIG. 2) and the fast axis remains unfocused.

The support segments 12 can be introduced together on a ring shaped mounting, wherein the holding segments can be displaced in the longitudinal direction back and forth with the assistance of an adjustment device to change the radial separation with respect to the circumference of the container 10. In addition, the height of the ring shaped mounting can be adjusted in such a fashion that the point of incidence of the laser beam on the circumference of the container 10 can be changed in the longitudinal direction.

FIG. 3 shows that the support segments 12 can also be disposed at an angle with respect to the axis of the container 10 which is not equal to 90 degrees. The overall configuration of the support segments 12 and the lasers 14 is conceptually arranged in a shape of a conical ring wheel.

Figures 4, 5:
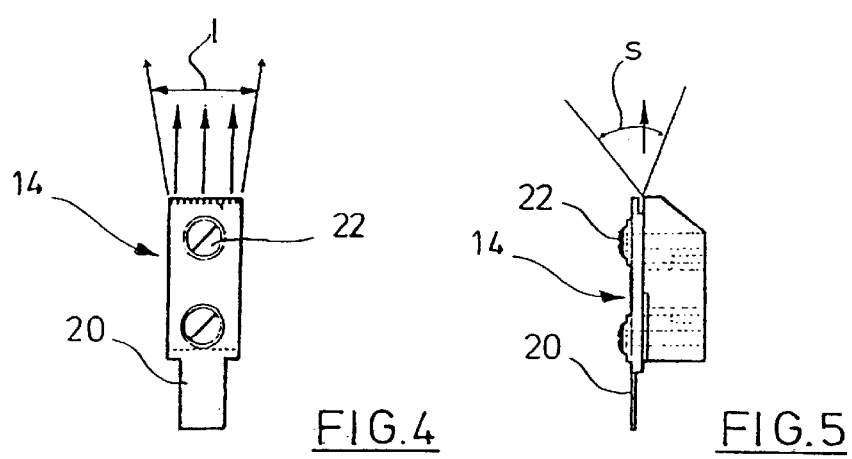
FIG. 4 schematically shows the plan view of a diode laser unit for the device in accordance with the invention.
FIG. 5 shows a side view of the laser diode unit according to FIG. 4.

The laser unit 14 is shown in more detail in FIGS. 4 and 5. Connection plates 20 and the bolts 22 are provided for connecting the lasers to the plates 20. The radiation angle 1 shown in FIG. 4 is produced by the slow axis. FIG. 5, illustrates the angle s in the fast axis. The former angle assumes values of approximately 10 degrees and the latter between 35 degrees and 45 degrees. The diode laser unit of FIGS. 4 and 5 can be connected to the support segment 12.

I claim:

1. A device for preparing an end of a plastic tubular container or tube for welding closed an opening at an end thereof, the device comprising:

a support device for holding the container in a stationary fashion, with the container opening facing in an upward direction;

a plurality of diode lasers for warming a ring shaped peripheral region of the container proximate the opening to facilitate subsequent welding along an elongated seam transverse to a longitudinal extension of the container; and a support means for holding the diode lasers in an approximately circular array such that their radiation is incident on at least one of an inner and an outer wall of the container.

2. The device of claim 1, further comprising optical means for influencing optical paths of light emitted by the lasers and incident on the container.

3. The device of claim 1, wherein the diode lasers are disposed at regular angular separations.

4. The device of claim 1, wherein at least one of said diode lasers and said support means can be adjusted along longitudinal axes thereof.

5. The device of claim 4, wherein at least one of said diode lasers and said support means comprise means for at least one of individual and common adjustment of the diode lasers.

6. The device of claim 1, wherein heights of at least one of said diode lasers and said support means can be adjusted at least one of individually and collectively.

7. The device of claim 1, wherein each diode laser has an associated radially disposed support and said support means are disposed to form a common ring shape.

8. The device of claim 2, wherein said diode lasers are disposed relative to a longitudinal container axis in such a fashion that their slow axes are parallel to said container axis.

9. The device of claim 8, wherein said optical means comprises means disposed in front of said diode lasers for focusing laser beam in said slow axis.

10. The device of claim 8, wherein said optical means comprises means disposed in front of said diode lasers for focusing laser beam in a fast axis of said diode lasers.

11. The device of claim 8, wherein said optical means comprise a spherical lens disposed in front of said diode laser for adjusting to a curvature of the container.

12. The device of claim 9, wherein said optical means comprise means for adjusting said optical means relative to said diode lasers and along an optical axis of said lasers.

13. The device of claim 2, wherein said optical means comprise a reflector disposed inside the container to reflect light not absorbed by a wall of the container, back onto that container wall.

* * * * *